(12) United States Patent
Stewart et al.

(10) Patent No.: US 9,092,244 B2
(45) Date of Patent: Jul. 28, 2015

(54) SYSTEM FOR DEVELOPING CUSTOM DATA TRANSFORMATIONS FOR SYSTEM INTEGRATION APPLICATION PROGRAMS

(75) Inventors: Mitchell J. Stewart, Malvern, PA (US); James T. Ahlborn, Downington, PA (US); Peter Michel, King of Prussia, PA (US)

(73) Assignee: Dell Products, LP, Round Rock, TX (US)

( * ) Notice: Subject to any disclaimer, the term of this patent is extended or adjusted under 35 U.S.C. 154(b) by 33 days.

(21) Appl. No.: 13/490,679

(22) Filed: Jun. 7, 2012

(65) Prior Publication Data

US 2013/0332899 A1    Dec. 12, 2013

(51) Int. Cl.
*G06F 9/44*   (2006.01)
*G06F 9/445*  (2006.01)

(52) U.S. Cl.
CPC .................................. *G06F 9/44505* (2013.01)

(58) Field of Classification Search
None
See application file for complete search history.

(56) References Cited

U.S. PATENT DOCUMENTS

| | | | |
|---|---|---|---|
| 5,410,675 A | | 4/1995 | Shreve et al. |
| 5,450,593 A | * | 9/1995 | Howell et al. ................... 726/21 |
| 5,794,246 A | | 8/1998 | Sankaran et al. |
| 5,917,730 A | | 6/1999 | Rittie et al. |
| 5,953,533 A | | 9/1999 | Fink et al. |
| 6,014,670 A | | 1/2000 | Zamanian et al. |
| 6,032,158 A | | 2/2000 | Mukhopadhyay et al. |
| 6,038,590 A | * | 3/2000 | Gish .............................. 709/203 |
| 6,044,374 A | | 3/2000 | Nesamoney et al. |
| 6,106,569 A | | 8/2000 | Bohrer et al. |
| 6,115,690 A | | 9/2000 | Wong |
| 6,134,706 A | | 10/2000 | Carey et al. |
| 6,208,990 B1 | | 3/2001 | Suresh et al. |
| 6,223,180 B1 | | 4/2001 | Moore et al. |
| 6,339,775 B1 | | 1/2002 | Zamanian et al. |
| 6,343,275 B1 | | 1/2002 | Wong |
| 6,418,400 B1 | | 7/2002 | Webber |
| 6,626,957 B1 | | 9/2003 | Lippert et al. |
| 6,640,226 B1 | | 10/2003 | Shringeri et al. |
| 6,789,096 B2 | | 9/2004 | Sankaran et al. |
| 6,820,077 B2 | | 11/2004 | Godfredsen et al. |
| 6,820,135 B1 | | 11/2004 | Dingman et al. |
| 6,823,373 B1 | | 11/2004 | Pancha et al. |
| 6,850,947 B1 | | 2/2005 | Chung et al. |

(Continued)

FOREIGN PATENT DOCUMENTS

WO    WO 02/102097 A1    12/2002
WO    WO 2008/134627 A2    11/2008

OTHER PUBLICATIONS

Boomi Integration Platform datasheet Boomi, Inc., 2006.

(Continued)

*Primary Examiner* — Don Wong
*Assistant Examiner* — Roberto E Luna
(74) *Attorney, Agent, or Firm* — Larson Newman, LLP (57) ABSTRACT

A method includes receiving packaged custom data transform element parameters at an information handling system wherein the information handling system hosts an automated development system platform for creating an integrated business process application. The method also includes registering a custom data transform element described by the custom data transform element parameters with the automated development system platform, and updating the automated development system platform with the custom data transform element.

20 Claims, 6 Drawing Sheets

(56) References Cited

U.S. PATENT DOCUMENTS

| | | | |
|---|---|---|---|
| 6,854,107 B2 | 2/2005 | Green et al. | |
| 6,895,409 B2 | 5/2005 | Uluakar et al. | |
| 6,895,471 B1 | 5/2005 | Tse et al. | |
| 6,922,831 B1 | 7/2005 | Kroening et al. | |
| 6,988,165 B2 | 1/2006 | White et al. | |
| 6,993,743 B2 | 1/2006 | Crupi et al. | |
| 6,996,584 B2 | 2/2006 | White et al. | |
| 7,117,215 B1 | 10/2006 | Kanchwalla et al. | |
| 7,162,643 B1 | 1/2007 | Sankaran et al. | |
| 7,171,647 B1 | 1/2007 | Smith et al. | |
| 7,181,457 B2 | 2/2007 | Reinauer et al. | |
| 7,496,888 B2 | 2/2009 | Sanjar et al. | |
| 7,499,951 B2 | 3/2009 | Mueller et al. | |
| 7,546,601 B2 * | 6/2009 | Byrd et al. | 718/104 |
| 7,590,724 B1 | 9/2009 | Williams | |
| 7,610,575 B2 | 10/2009 | Sproule | |
| 7,681,185 B2 * | 3/2010 | Kapoor et al. | 717/140 |
| 7,761,842 B2 * | 7/2010 | Udler | 717/106 |
| 7,792,784 B2 | 9/2010 | Gupta | |
| 7,805,355 B2 * | 9/2010 | Wigzell | 705/37 |
| 7,941,784 B2 * | 5/2011 | Shenfield et al. | 717/107 |
| 8,036,939 B2 | 10/2011 | Gil et al. | |
| 8,060,396 B1 | 11/2011 | Bessler et al. | |
| 8,095,416 B2 | 1/2012 | Harvey et al. | |
| 8,126,762 B2 | 2/2012 | Ramachandran et al. | |
| 8,165,993 B2 | 4/2012 | Broda et al. | |
| 8,271,615 B2 | 9/2012 | Ellison et al. | |
| 8,276,115 B2 | 9/2012 | Bates et al. | |
| 8,418,140 B2 * | 4/2013 | Iyer et al. | 717/121 |
| 2001/0052112 A1 | 12/2001 | Mohan et al. | |
| 2002/0016771 A1 | 2/2002 | Carothers et al. | |
| 2002/0073396 A1 | 6/2002 | Crupi et al. | |
| 2002/0095650 A1 | 7/2002 | Green et al. | |
| 2002/0104067 A1 * | 8/2002 | Green et al. | 717/101 |
| 2003/0221184 A1 | 11/2003 | Gunjal et al. | |
| 2003/0236677 A1 | 12/2003 | Casati et al. | |
| 2004/0068431 A1 | 4/2004 | Smith et al. | |
| 2004/0133876 A1 | 7/2004 | Sproule | |
| 2005/0005262 A1 | 1/2005 | Mohan et al. | |
| 2005/0198618 A1 | 9/2005 | Lalonde et al. | |
| 2005/0273758 A1 * | 12/2005 | Long | 717/101 |
| 2006/0161495 A1 | 7/2006 | Wigzell | |
| 2006/0184933 A1 | 8/2006 | Chessell et al. | |
| 2006/0206861 A1 * | 9/2006 | Shenfield et al. | 717/106 |
| 2007/0083850 A1 * | 4/2007 | Kapoor et al. | 717/106 |
| 2007/0168206 A1 | 7/2007 | McCall et al. | |
| 2007/0198708 A1 * | 8/2007 | Moriwaki et al. | 709/224 |
| 2008/0163164 A1 | 7/2008 | Chowdhary et al. | |
| 2008/0189679 A1 * | 8/2008 | Rodriguez et al. | 717/105 |
| 2008/0196006 A1 | 8/2008 | Bates et al. | |
| 2008/0209078 A1 | 8/2008 | Bates et al. | |
| 2008/0243884 A1 | 10/2008 | Mehta | |
| 2008/0270977 A1 * | 10/2008 | Nucci et al. | 717/105 |
| 2009/0049438 A1 * | 2/2009 | Draper et al. | 717/168 |
| 2009/0106067 A1 * | 4/2009 | Mann et al. | 705/8 |
| 2009/0112666 A1 | 4/2009 | Guo et al. | |
| 2009/0171758 A1 | 7/2009 | Alfandary et al. | |
| 2009/0228428 A1 | 9/2009 | Dan et al. | |
| 2010/0023362 A1 | 1/2010 | Nguyen et al. | |
| 2010/0042641 A1 | 2/2010 | Kamalakantha et al. | |
| 2010/0070317 A1 | 3/2010 | Pachter et al. | |
| 2010/0070556 A1 | 3/2010 | Heusermann et al. | |
| 2010/0070981 A1 | 3/2010 | Hadar | |
| 2010/0138257 A1 | 6/2010 | Wocher et al. | |
| 2010/0169148 A1 | 7/2010 | Oberhofer et al. | |
| 2010/0185510 A1 | 7/2010 | Maier et al. | |
| 2010/0299653 A1 * | 11/2010 | Iyer et al. | 717/121 |
| 2010/0306709 A1 | 12/2010 | Lynch et al. | |
| 2010/0332510 A1 | 12/2010 | Gitai et al. | |
| 2010/0332535 A1 | 12/2010 | Weizman et al. | |
| 2010/0333083 A1 * | 12/2010 | Chancey et al. | 717/174 |
| 2011/0029575 A1 | 2/2011 | Sagi et al. | |
| 2011/0061045 A1 * | 3/2011 | Phillips | 717/173 |
| 2011/0061046 A1 * | 3/2011 | Phillips | 717/176 |
| 2011/0078607 A1 | 3/2011 | Ryan et al. | |
| 2011/0154311 A1 * | 6/2011 | Acker et al. | 717/168 |
| 2011/0209114 A1 * | 8/2011 | Andersen | 717/101 |
| 2011/0282715 A1 | 11/2011 | Nguyen et al. | |
| 2012/0041945 A1 | 2/2012 | Blubaugh | |
| 2013/0167121 A1 * | 6/2013 | Hoff | 717/124 |

OTHER PUBLICATIONS

Boomi on Demand product data sheet Boomi, Inc., 2007.
Boomi AS2 Transport datasheet Boomi, Inc., 2006.
Boomi, Inc., Announces General Availability of the Boomi Integration Platform V3.0, PR Newswire, Jan. 16, 2004.
Dell Agrees to Acquire Software Firm Boomi Wall Street Journal, Nov. 3, 2010.
Silk, Scott, Automating the Balanced Scorecard Management Accounting, vol. 19, No. 11, May 1998.
Arnold, Tom, Dashboard & Scorecard Software Tools for Operations Management and Strategy Deployment Summit Media Partners, Sep. 18, 2002.
Norton, David, SAP Strategic Enterprise Management: Translating Strategy Into Action: The Balanced Scorecard SAP, May 1999.
TIBCO Staffware Process Suite product brochure TIBCO Software Inc., 2006.
Chambers, Bill et al., Real-Time Data Access Using Business Process Management VARBusiness, vol. 19, No. 23, Nov. 10, 2003.
Sturim, Robert, Achieving Competitive Advantage Through Supply Chain Integration Vitria Technology Inc., 1999.
Intalio Adds Celequest BAM Technology to Its BPMS Solution; Celequest Management Dashboards Integrated into Intalio/BPMS, Business Wire, Jan. 17, 2006.
Viane, Stijn et al., Corporate Performance Management: Beyond Dashboards and Scorecards Journal of Performance Management, vol. 20, No. 1, 2007.
Ergometrics.com web pages Ergometrics, Mar. 2000, Retrieved from Archive.org Jan. 25, 2007.
iDashes.net web pages iDashes, Inc., May 2001, Retrieved from Archive.org Jan. 25, 2007.
Performance Dashboards: Measuring, Monitoring, and Managing Your Business: Education and Research The Data Warehouse Institute, PowerPoint presentation, 2006.
Eckerson, Wayne E., Performance Dashboards: Measuring, Monitoring, and Managing Your Business: John Wiley & Sons, ISBN 13-978-0-471-724179-9, 2006.
"The Quest for a Cloud Integration Strategy," Boomi Whitepaper, 2011, http://marketing.boomi.com/QuestForCloudIntegration.html.

* cited by examiner

SYSTEM FOR DEVELOPING CUSTOM DATA TRANSFORMATIONS FOR SYSTEM INTEGRATION APPLICATION PROGRAMS

CROSS REFERENCE TO RELATED APPLICATIONS

Related subject matter is contained in co-pending U.S. patent application Ser. No. 12/110,607 entitled "System and Method For Automated On-Demand Creation of a Customized Software Application," filed on Apr. 28, 2008, the disclosure of which is hereby incorporated by reference.

Related subject matter is also contained in co-pending U.S. patent application Ser. No. 13/333,517 entitled "System to Automate Development of System Integration Application Programs and Method Therefor," filed on Dec. 21, 2011, the disclosure of which is hereby incorporated by reference.

FIELD OF THE DISCLOSURE

This disclosure generally relates to information handling systems, and more particularly relates to developing custom data transformations for use in designing integrated business process applications.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, procurement, stocking and delivery tracking, provision of data services and software, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Today, most businesses and other enterprises have sophisticated computing systems that are used for facilitating internal operations and for communicating outside the enterprise's network, for example to exchange information with business partners. Much of present day information exchange is conducted electronically, via communications networks, both internally to the enterprise, and among enterprises. Accordingly, it is often desirable or necessary to exchange information or data between distinctly different computing systems, computer networks, software applications, etc. The enabling of communications between diverse systems or networks or applications in connection with the conducting of business processes is often referred to as business process integration.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. These applications are typically purchased from software vendors and installed on a computerized system owned and maintained by the business, in this example the buyer. The seller will have a similar or complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users or systems in an identical, generic form. The software application is then installed within a specific enterprise's computing network, which may include data centers, etc. located outside the physical boundaries of the enterprise. After the generic application is installed, it is then configured and customized for a specific trading partner. The customized application can be executed to exchange data between the specific trading partner and the enterprise. For example, Wal-Mart may provide on its website specifications of how electronic data such as Purchase Orders and Invoices must be formatted for electronic data communication with Wal-Mart, and how that data should be communicated with Wal-Mart. A supplier or enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

In the business process integration context, communication should occur between different software applications or systems within a single computing network, such as between an enterprise's information warehouse management system and the same enterprise's purchase order processing system. Communication should also occur between different software applications or systems within different computing networks, such as between a buyer's purchase order processing system and a seller's invoicing system. In the present disclosure, when developing integrated business processes to enable such communication, use of an automated development system platform to model and generate customized executable system integration software applications may be helpful. Not all functionality may be anticipated, however, among the tools made available to model a desired end-to-end integrated business process. Certain elements may need to be created to achieve a custom function at a point in the business process data flow. It may be useful to provide a system to create custom data transformation elements that may be used with the automated development system when designing an integrated business process. Such systems may facilitate distribution, use, and maintenance of the custom functionality when modeling integrated business processes.

A more comprehensive set of data relating to further detail about the integrated business processes may also be gathered. This additional detailed data may be referred to as tracked data. This tracked data may be important in the business-to-business (B2B) context. Tracked data allows a user access to details enabling a more thorough analysis and diagnosis of an integrated business process. For example, a user may track progress of orders more effectively in an integrated business process with tracked data.

U.S. patent application Ser. No. 12/110,607 describes a system and method for automated development of customized executable system integration software applications. For example, an enterprise can define an integration system via a modeling process to enable bi-directional exchange of data between internal applications, between internal applications and external trading partners, or between internal applications and applications running external to the enterprise. Applications running external to the enterprise are commonly referred to as Software as a Service (SaaS). Integration software can assist defining the business process to be integrated by a user. Each integrated business process represents a complete end-to-end interface. For example, a process could be customized to accept a purchase order (PO) from a retailer such as Wal-Mart, transform the PO into a format recognizable by a certain internal order management software application of the enterprise, and then insert the contents of that PO directly into the enterprise's order management system. The customized executable system integration software application that results normally provides the desired interoperability as defined by the party using the integration software application code. It is methodology pertaining to the customization of discrete elements to be included in the customized executable system integration software applications that is discussed herein.

FIGS. 1-6 illustrate a system and method for creating customized data transform elements. These customized data transform elements as well as pre-existing business process visual elements may be used in modeling and developing customized system integration application programs. A web-based graphical interface is used to visually model a business process via a flowcharting process. During this modeling process the user selects from a predetermined set of process-representing visual elements that are stored on a remote server, such as the web server. This is the elements directory. The customized data transform elements created by this system and method may be included in the predetermined directory of visual elements. For example, an enterprise can define an integration system to enable bi-directional exchange of data between internal applications, between internal applications and external trading partners, or between internal applications and applications running external to the enterprise. Applications running external to the enterprise are commonly referred to as Software as a Service (SaaS). Each integration process represents a complete end-to-end interface. For example, a process could be modeled to accept a purchase order (PO) from a retailer such as Wal-Mart, transform the PO into a format recognizable by a certain internal order management software application of the enterprise, and then insert the contents of that PO directly into the enterprise's order management system.

The automated development system generates custom software to provide the desired interoperability as defined by the integration flowchart. The custom software may be packaged within a container program, also referred to herein as a dynamic runtime engine. The dynamic runtime engine may be an executable software application capable of running on a computer within the enterprise's network, which may include, for example, networks owned and/or operated by third party data center providers, such as OpSource, Amazon, etc. When started by a user, the executable software application connects to the automated development system and downloads an Extensible Markup Language (XML) representation of the visual model representing the integration process, and all requisite code needed to run the integration process. The required code includes a generic application template, selected predefined code sets that are selected as a function of the user's needs as defined by the modeled process, and a data code set that includes configuration input provided by the user for customizing the stock components for a specific integration process. Additional components, including customized data transform elements, may be retrieved as required. As changes are made to this model, via the website, or to the code that executes the model, the executable software application will automatically check for and apply these changes as needed without requiring human intervention.

Figure 1:
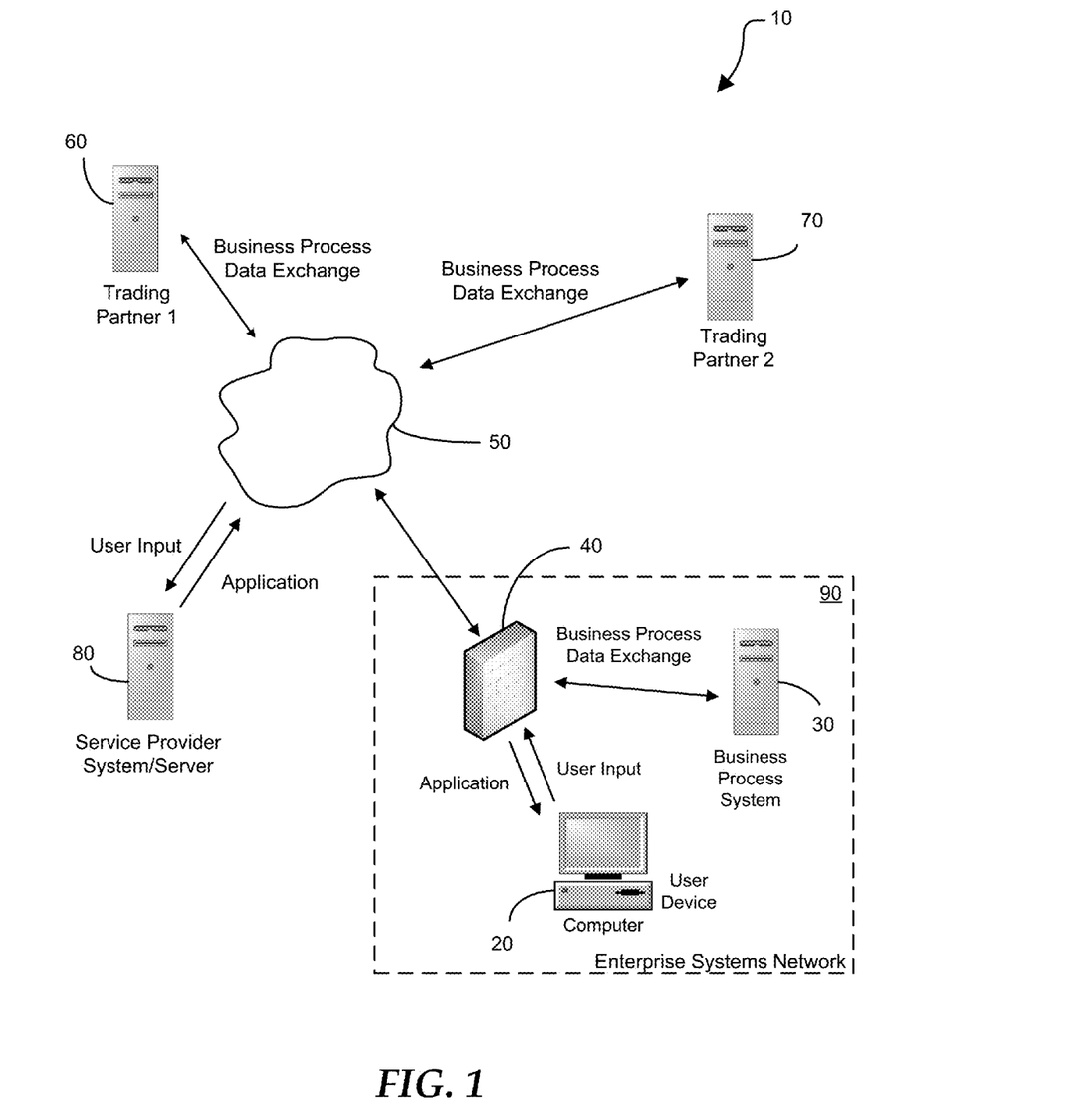
FIG. 1 is a block diagram illustrating a distributed business network system according to an embodiment of the present disclosure.

FIG. 1 shows a distributed business network system 10 including conventional information handling systems of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the system 10 includes a conventional user/client device 20, such as a personal computer, enabling a user to communicate via a communications network 50, such as the Internet. The exemplary user device 20 may be configured with conventional web browser software. The web browser, such as Microsoft Corporation's Internet Explorer web browser software, allows the user to interact with websites via the network 50. The client device 20 is positioned within an enterprise network 90 behind an enterprise network's firewall 40. For illustrative purposes, the enterprise network 90 includes a business process system 30, which may include conventional computer hardware and commercially available Enterprise Resource Planning (ERP) and other business process software, such as QuickBooks, SAP's MySAP ERP, Oracle's OneWorld JP Edwards' ERP, Infor's WMS application, and the like. The system 10 further includes trading partner systems 60 and 70 for receiving and/or transmitting data relating to business-to-business transactions. For example, Wal-Mart may operate trading partner system 60 to allow for issuance of purchase orders to suppliers and to receive invoices from suppliers in electronic data form as part of electronic data exchange processes.

Finally, the system 10 includes a service provider system or server 80. In one embodiment, the service provider server 80 receives data from a user such as enterprise system/network 90 indicating the modeled integration of the business process. In another embodiment, the service provider server 80 may generate a customized executable system integration software application to run an integrated business process at an enterprise location or another hosted location. Business process data may be reported to the service provider server 80 from business processes running at hosted locations or enterprise locations in various embodiments. This business process data may be aggregated and stored at the server 80. In an additional embodiment, the service provider server 80 may administer one or more business processes.

The system and methods disclosed herein allow an enterprise to obtain the capabilities needed to conduct the electronic exchange of data with one or more trading partners, internal applications, or applications available via the Internet, commonly referred to as Software as a Service. The present disclosure provides these capabilities in by providing the enterprise with a software application including the configuration information required for conducting the integration process, and also the executable code needed to make the process run, and specially configuring this application to run within the enterprise's network, for example, behind the firewall of the enterprise or within a third-party-hosted data center, etc., that is considered to be part of the enterprise's network so that it may connect to various software applications running internal to the enterprise's network. Alternatively, the software application including the configuration information required for conducting the integration process, and the executable code needed to make the process run may be specially configured to run at an different location such as within the hosted network.

In accordance with the present disclosure, a provider of a service (service provider) for creating on-demand, real-time creation of customized software applications operates a service provider server/system 80 within the network 10. The system 80 may be specially configured in accordance with the present disclosure, and may be capable of communicating with devices in the enterprise's network 90 or in another network such as a hosting network. It should be noted that the communication between system 80 and network 90 is essentially unidirectional in that communications/communication sessions originate from network 90 to system 80, and not from system 80 to network 90. Accordingly, the network 90 need not have its firewall 40 modified to allow incoming traffic from communications sessions originating from system 80.

The automated development system may be configured in accordance with the present disclosure to provide web server functionality for presenting a user-accessible website. Communications between the user device 20 and the system 80 website may be performed using conventional communications technologies, such as the HTTPS protocol. The website may be specially configured to provide a graphical user interface providing a visual designer environment permitting a user to define process flows between applications/systems, such as between trading partner and enterprise systems, to model a customized business integration process. The graphical user interface may be used by different enterprises/customers of the service provider. The interface provides a menu of pre-defined user-selectable visual elements, and permits the user to arrange them as appropriate to model a process. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the service provider system 80.

The graphical user interface allows the user to provide user input providing information relating to trading partners, activities, enterprise applications, enterprise system attributes, and/or process attributes that are unique to the end-to-end business integration process of a specific enterprise. For example, the graphical user interface may provide drop down or other user-selectable menu options for identifying trading partners, application connector and process attributes, parameters, and settings, and dialog boxes permitting textual entries by the user. The dialog boxes may describe the format and layout of a particular data set to be sent or received, for example for a Purchase Order data set.

Service provider system/server 80 transmits data to enterprise system/server 90 providing a graphical user interface and business process elements to enable automated development of the integrated business process data flows. This automated development system further provides the designer or enterprise user with an option to design and set configuration parameters for a custom data transform element in the event a desired data transformation functionality is not available already in the automated development system. This custom data transform element may be included within the service providers' automated development system for later use. In other embodiments, one or more functions described above may occur at a system or server in a different location, such as at a service provider system/network 90 or at a trading partner location.

Figure 2:
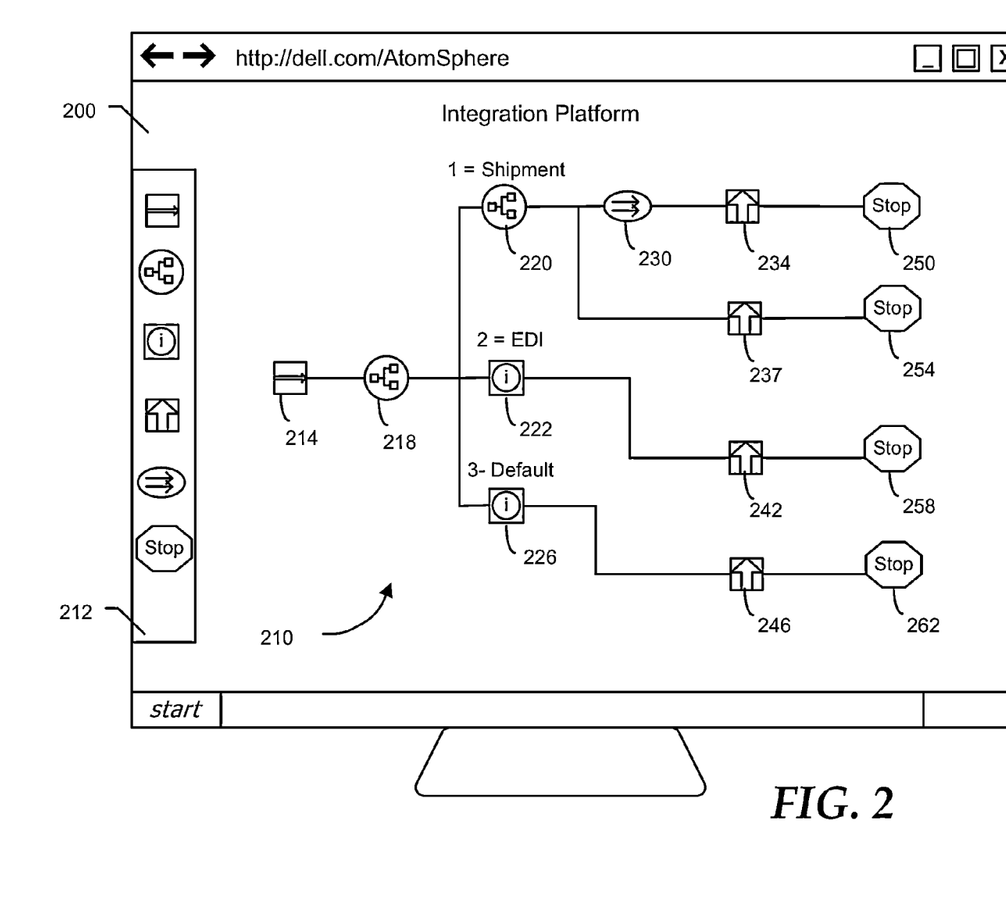
FIG. 2 illustrates a visual model of an example business process according to an embodiment of the present disclosure.

The user may create a model business process or processes to be executed by the customized executable system integration software application via graphical editor. By way of illustrative example, the website interface may provide a menu of visual element icons in a drag-and-drop environment permitting the user to create a visual model of business process activities desired to be handled by a customized executable system integration software application. For example, this may involve a user's identification of receipt of purchase orders as an activity, or of issuance of invoices as an activity. By way of illustrative example, FIG. 2 shows a graphical user interface 200 of an integration platform displayed within a web browser window 150. The exemplary graphical user interface 200 displays an exemplary business process integration model 210 in the form of a flow diagram modeling a shipment order business process. The visual model may be created by a user within the visual designer environment, via the website interface provided by the system 80.

The exemplary flow diagram of FIG. 2 shows such a modeled business process and includes an Inbound connector element 214, Routing process elements 218 and 220, Document Property elements 222 and 226, Data Transformation process element 230, Outbound connector elements 234, 238, 242, and 246, and Process End elements 250, 254, 258 and 262. Various ones of these elements are selected from a menu 212 of elements and arranged by the user relative to one another as appropriate to model a corresponding business process. The elements may require data input from a user. For example, the inbound connector element 214 selected from the menu by the user may be configured by the user for a specific enterprise and process by the user's selection of the element and completing dialog boxes, selecting menu items, etc. as appropriate. Since the elements may require data input from a user, the resulting codesets that make up the customized executable system integration software application contain information about each element. For example, the inbound connector element 214 may be configured for a specific enterprise and process with data input via dialog boxes or selecting menu items, etc. as appropriate. For example, data entry element 214 may be configured such that the input data will be inbound from an SAP system. The element, in combination with data related to that portion of the business process is associated with a specific Connector code set stored in the memory of the system 80. Each Connector is comprised of a modular codeset that is customized for communicating with the specific software application or system. The customized codeset therefore provides connectivity for specific software applications, databases, and/or systems. The outbound connector elements may be similarly configured. For example, the last step of the integrated business process may involve sending shipping order data to Company X system. The Shipping Order will be prepared as an XML message, which is a readily recognizable format. The XML message is then sent to the outbound connector, and the outbound connector converts the XML message from this simple, recognizable format into the proprietary format that is understood by the SAP system. The input and output data formats for the conversion are associated with the modular codeset selected and customized for the outbound connector element. Additionally, the routing element may require custom data associated with it for proper application of the routing logic; the Document Properties element may require input for file naming, file storage location, etc. to be applied. There may be other elements that result in codesets for the customized executable system integration software application as customized by the user and generated by the service provider.

By way of further example, the routing element may require configuration input for routing logic to be applied; the Document Properties element may require input for file naming, file storage location, etc. to be applied. There may be other elements as appropriate or necessary for modeling business processes, as desired.

Each branch of the flow diagram represents an end-to-end business process to be integrated. In the example of FIG. 2, the first (top-most) branch may model a process involving receipt of data from an SAP system in a corresponding format, routing the data according to prescribed logic (for example, 1=shipment), further routing according to further logic, transforming the data from the SAP system format to the destination system format by Data Transformation process element 230 to create an appropriately formatted XML document, and then transmitting the transformed data to the destination system in accordance with the properties and attributes of the outbound application connector 234. Examples of other common activities include synchronizing customer data between applications, synchronizing product information between applications, notification of receipt of goods ordered by a retailer, receipt of a work related injury claim, and many others.

It is desirable in certain circumstances to provide customized functionality within an integrated business process design such as the visual model depicted in FIG. 2. This may be done by manual addition of customized code to the generated customized executable system integration software application. Difficulties with this approach arise however when such customized data transform functionality may need to be repeatedly used in modeling integrated business processes.

The present disclosure provides for a system and method for creating custom data transform elements for use in the automated development system. These custom data transform elements may have icons associated with implementation code that can execute the desired data transformation within a data flow of an integrated business process. The custom data transform element icon may be selectable from an element menu 212 in the graphical user interface or accessible via a library of optional elements. The icons in the element menu access a directory of code elements for use in preparing an integrated business process. The customized data transform element icon may then be used in visually modeling an integrated business process data flow of an end-to-end integrated business process. The customized data transform element may also require input configuration settings to operate.

Having the system for creating custom data transform elements within the automated development system permits enterprise users to provide custom functional elements for visual modeling of an integrated business process. There is no need to insert of custom code or scripts each time a design calls for this custom functionality. The custom data transform element becomes part of the automated development system. It is therefore easier to share, publish, package, and maintain the code representing the custom data transform functionality. The customizability of a data transform element provides an enterprise user with the ability to create a unique element that may be used repeatedly. The customized data transform element may be limited only to designated users, such as those associated with an account. In the alternative, the customized data transform element may be more broadly shared with all users of the automated development system.

Creating a custom data transform element also permits efficiency in delivering updates and pushing code out to users via the automated development system. Updates and amended or modified code or configuration requirements may be made to the customized data transform element in the automated development system. This avoids the need to communicate such changes directly to users as with the case when customized code is implemented manually to achieve a desired functionality.

Visual elements, including custom data transform elements, may require configuration information. One such type of information may be data profile definitions and data maps. Documents that are read into or sent out of a business process, such as the business process of FIG. 2, are each associated with a data profile. The data profile describes the layout or format of respective documents. For example, a data profile associated with a document may include field names, delimiters or column positions, data types, minimum/maximum string lengths, and the like. Profiles are most notably used in association with data maps. Data maps describe how information can be transferred from one document to another. For example, to transfer information included at an XML document to a flat file, the format of each document can be encoded using a respective data profile. Additionally, an application can use a data profile to inspect a corresponding document. Accordingly, a data maps include a source data profile, a destination data profile, and mapping information indicating a correspondence between each fields of the source data profile and a respective field of the destination data profile. This configuration information is relevant to the function of many types of elements used to comprise integrated business process customized executable system integration software applications generated by the automated development system platform. When a user can generate a symbolic representation of a business process using the graphical user interface 200 provided by a service provider 80. The business process can include a data map specifying how information included at one application can be mapped to another application. Map functions corresponding to the associations are identified in a function database within a mapping database.

Figure 3:
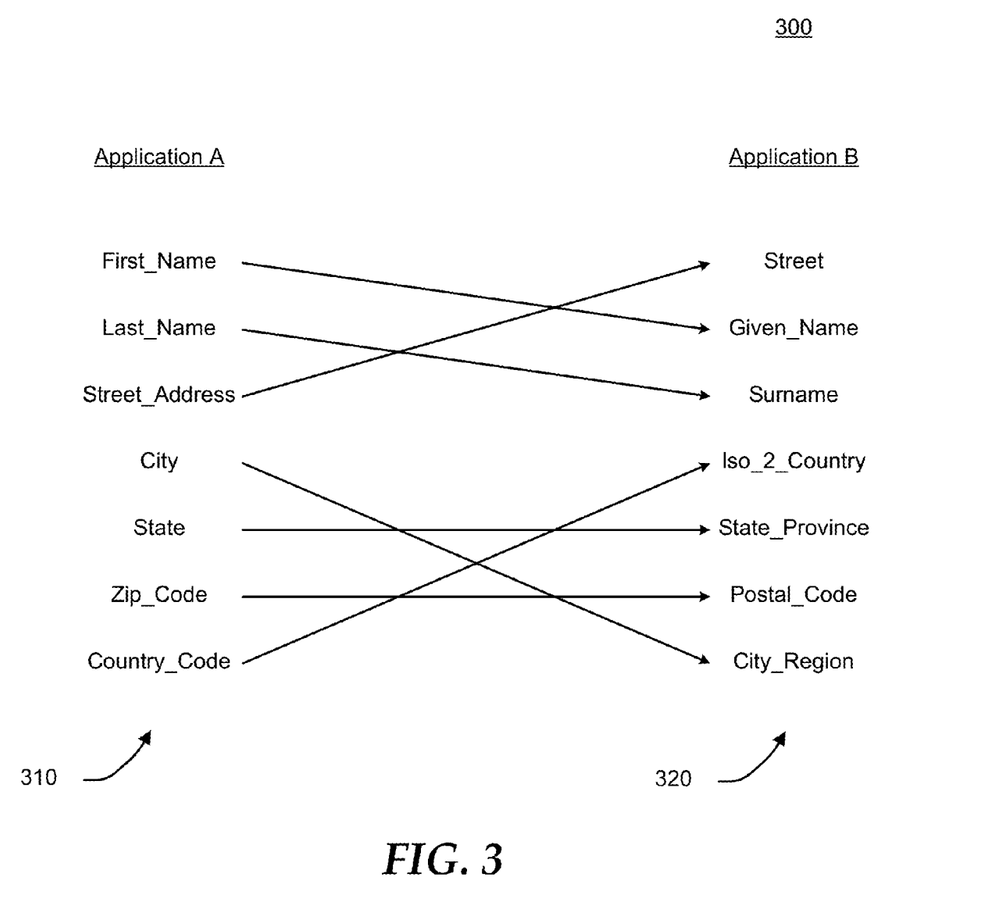
FIG. 3 is a diagram illustrating a data map including a map function according to an embodiment of the present disclosure.

FIG. 3 shows a data map 300 according to an embodiment of the present disclosure. The data map 300 includes data fields 310 included at a first software application, labeled Application A, and data fields 320 included at a second software application, labeled Application B. Each data field represents a variable that can be associated with a value. For example, the data fields 310 include variables First_Name, Last_Name, Stree_Address, City, State, Zip_Code, and Country_Code. The data fields 320 include Street, Given_Name, Surname, Iso_2_Country, State_Province, Postal_Code, and City_Region. In an embodiment, a user of the business process integration platform graphical user interface 200 can manually generate a data map.

In an embodiment of the present disclosure, a user may drag and drop individual fields associated with a source data profile to a corresponding field of a destination data profile, as indicated by the arrows of FIG. 3. For example, the variable First_Name of Application A has been mapped to the variable Given_Name of Application B. The service provider 80 of FIG. 1 may use the data map 300 to generate and configure a system integration application program that will implement a customer's business process, such as the business process integration model 210 of FIG. 2. In another embodiment, the generation of a data map may be partially or fully automated based on information stored at a map database.

Map functions allow conversion logic to be applied to individual values as they are being mapped. For example, the user may want to convert a character to uppercase, change the format of a date, or look up a value in a database. There are two main types of functions: Standard functions and User defined functions. Standard functions perform a single step, such as converting a value to uppercase. For example, converting a value to uppercase; and User Defined functions enable sophisticated transformations by allowing the user to link multiple standard functions steps together. They are saved as standalone components and reused. Map Functions allow conversion logic to be applied to individual values as they are being mapped. For example, the user may want to convert a character to uppercase, change the format of a date, or look up a value in a database.

Functions can include string functions, numeric functions, date functions, lookup functions, custom scripting functions, connector functions, properties functions, and the like. The Right Character Trim function applied to the variable Zip_Code to truncate a ten character code to a five character value to meet the criterion of a field Postal_Code is an example of a string function. An example of a numeric function is a Math Ceiling function, which rounds the value of an input variable up to the nearest whole number, for example 1.2→2.0. An example of a date function is a Date Format function, which reformats a date value associated with a source element into a format compatible with a destination element. For example, a variable associated with a date at a source document may utilize a date format YYYYMMDD while a corresponding variable at a destination document may instead have a format MMDDYYYY or MMDDYY. The Date Format function modifies the value of a date variable as it passes from a source application to a destination application.

An example of a lookup function is a SQL Lookup, which executes a static or dynamic select-query against a database. This function is typically used to perform cross reference lookups or obtain supplemental data. A custom scripting function can be configured to perform complex manipulations using JavaScript, Groovy syntax, or another programming language or scripting language. An example of a connector function is a Connector Call function, which perform a call out to any application connector. Like the lookup function, the Connector Call function is typically used to perform cross reference lookups or obtain supplemental data. Property functions include Set Process Property, Get Process Property, and the like, which are used to set and retrieve, respectively, the value of a process property. Process properties are name/value pairs or variables that can be used to store arbitrary information to assist the automated development system with generating an integration code set. The properties have execution scope, meaning once set they remain available for the duration of the current process execution. This also means the properties are available across other processes initiated via a Process Call step, as is common in parent/child process designs. Additional information relating to data maps and map functions may be found in U.S. patent application Ser. No. 13/333,517, filed on Dec. 21, 2011, the disclosure of which is hereby incorporated by reference.

The customized executable system integration software application may be packaged within a container program, also referred to herein as a dynamic runtime engine. An example runtime engine that may package the customized executable system integration software application is a JAVA runtime engine. The dynamic runtime engine may be an executable software application capable of running on a computer within the enterprise's network, which may include networks owned and/or operated by third party data center providers such as OpSource or Amazon. Alternatively, the runtime engine may be distributed and operate on one or more hosted information handling systems accessible by a customer or user. As changes are made to the model underlying the customized executable system integration software application, the executable software application can automatically check for and apply these changes as needed without requiring human intervention.

Integrated business process elements, including customized data transform elements, may monitor information relating to the operation of the customized executable system integration software application. For example, the monitored information may be used for diagnostic purposes and planning purposes. The data gathered while monitoring the execution of an integrated business process event may be stored as a business process execution record for that event. The types of data gathered and the historical record of that gathered data may be referred to as monitored business process data.

During an execution of the customized executable system integration software applications that integrate diverse user applications and business processes, several types of operational metrics and identifying information are gathered and reported. This monitored business process data creates a process execution record. The categories of data that may be monitored in a process execution record comprise the monitored business process data for customized executable codesets that form the customized executable system integration software applications. In other words, the monitored business process data is the data that is kept for each execution of an integrated business process. This data is aggregated and stored for each executable system integration software application deployed for a user.

The customized executable system integration software application elements measure and store monitored business process data including, for example: the business process integration start time; the business process integration running time; data input levels; data output levels; input document counts; output document counts; throughput levels; execution counts; and overall process errors. Several other factors identifying business processes or measuring usage and activity of the customized executable system integration software applications may also be gathered or measured as monitored data. These various types of metrics may also be made part of the business process execution record. Table 1 shows example types of monitored business process data fields that may be included in the business process execution record.

| FIELD | DESCRIPTION |
| --- | --- |
| Execution ID | Unique identifier assigned to an execution |
| Account ID | Unique identifier assigned to a user or enterprise |
| Location ID and Name | Name and number ID assigned to the location of the business process |

-continued

| FIELD | DESCRIPTION |
| --- | --- |
| Location Local ID | ID number of the local location within the cloud hosting the business process |
| Date Group | The day the process ran |
| Deployment ID | A unique identifier pointing to a version of the process |
| Elapsed Time | Duration of time it took to run the process |
| Error | A brief error message, if applicable |
| Error Count | The number of documents that had errors |
| Execution Mode | Whether a manual execution, or a scheduled one, etc |
| Connector Usage | Connector types deployed, names, and the number of connectors |
| Inbound Document Count and Size | The number of documents received inbound and their size |
| Outbound Document Count and Size | The number of documents outbound and their size |
| Throughput | Document inbound size + document outbound size/2 |
| Process ID and Name | Name and unique identifier of a business process |
| Original Execution ID | Applicable if this execution was a retry of a previous execution; unique identifier of the previous execution |
| Retry Flag and Count | Status as a retry and how many |
| Start Step Information | ID, action, name, type, etc. |
| Status | Success, error, or pending |
| Top Level Process ID | If this is a sub process, ID number of the top process |

The business process execution record must at least include the following monitored business process data: the process ID or name, the execution ID, the account ID, and at least one measured data metric.

Additional types of data, referred to as tracked data, may also be gathered relating to the operation of an integrated business process. For example, more in depth information may be important to the service provider, enterprise, or trading partner relating to the documents or data passing through the customized executable system integration software applications. This additional in-depth tracked data can permit, for example, an order to be tracked through the system as it is passed through the customized executable system integration software applications. By way of additional example, tracked data may be information recorded about individual documents. Tracked data may comprise a time record when a document was processed, how it was processed, a document name or descriptor, the category of document (order, invoice, type of business, or other), which connectors and other elements of the integrated business process the document passed through, and any correspondence related to the document. Examples of tracked data may also include connector read files indicating file names, order numbers, invoice numbers, account identification information, document fields such as account names, relationships between documents and sub-documents of one or more business processes. Tracked information may also include the relationships between inbound and outbound documents; including inbound documents that may split into more than one outbound document or plural inbound documents combined into fewer outbound documents. Further discussion of details about business process data that is maintained and tracked may be found in U.S. patent application Ser. No. 13/471,847, filed on May 15, 2012, the disclosure of which is hereby incorporated by reference.

Figure 4:
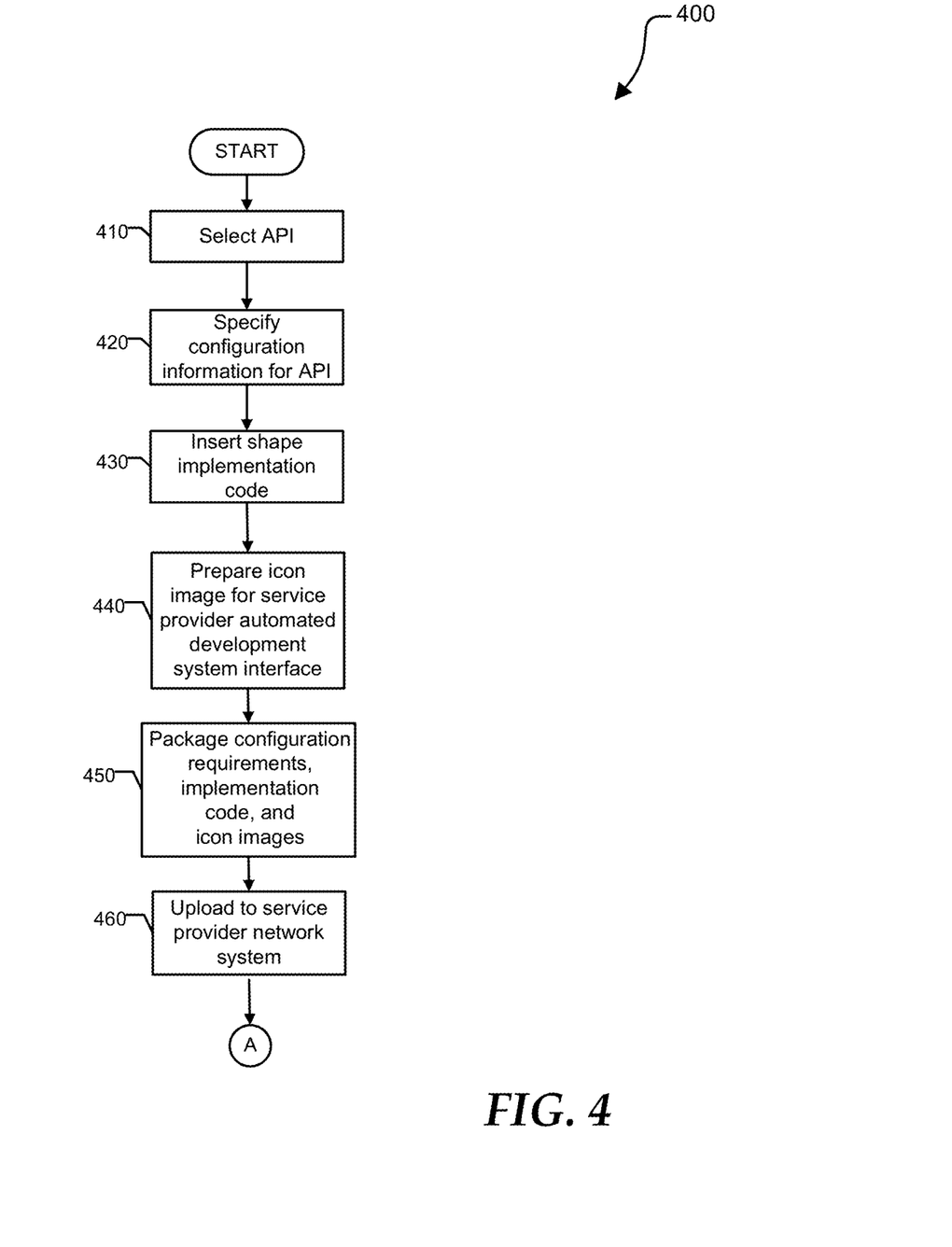
FIGS. 4 and 5 are flow diagrams illustrating a method according to an embodiment of the present disclosure.

FIG. 4 shows a method 400 in accordance with an embodiment of the present disclosure for creating a custom data transform element for use in visually modeling an integrated business processes using an automated development system platform. The method 400 generally describes setting required configuration information, acquiring implementation code to execute the transformation of data, and accepting an icon image to represent the custom data transform element in a graphical user interface. These and additional parameters may be collected relating to the custom data transform element during its creation. The parameters for a custom data transform may be determined in any order and the disclosure is not limited to the order shown in 400. The data transform elements generally, including the custom data transform elements are sometimes referred to herein as shapes.

Several types of parameters may be collected or required by the system for creating the customized data transform element. These parameters are gathered into a format useable by the automated development system platform. One example parameter that may be collected includes information identifying the custom data transform element or describing its functionality. This may be a unique code, name, or description field assigned to the custom data transform element. It may also be an icon identifying the custom data transform element.

In another example, publication limitations for the custom data transform element may be set as a parameter. This may include a default publication limitation such as always limiting the access to the account of the user submitting the custom data transform element. Alternatively, the default may be to always allow general publication within the automated development system. In another embodiment, the system for creating the custom data transform element may require a publication election to be made by the submitting user. Use limits for the custom data transform element may be limited to an enterprise, one or more accounts, or may be generally published for use within the wider automated development system platforms offered by a service provider.

The flow begins at block 410 where a specific application programming interface (API) is selected. The API sets a format for the information or code entered to create the custom data transform element so that it may be seamlessly integrated into the wider code of the automated development system platform. One of multiple API's may be selected depending on the type of data transformation to be made. For example, if the data transformation takes one document as an input and creates one document as an output, a simpler 1:1 API format may be used. Alternatively an API may be selected where the data transformation transforms one input document into many output documents (1:many) or many documents transformed into one output document (many:1). The most complex API example available may transform many input documents into many output documents (many:many). These variations of API-type provide for the tracking, routing and organization of the information. The API-type is more complicated as the ratio of input to output documents becomes more complex.

The flow proceeds to block 420 where the system for creating the custom data transform element solicits input settings specifying what is needed to configure the custom data transform element. The configuration data required may include the attributes of the custom data transform element enabling identification of the data to be shaped or how it is shaped within an integrated business process design. Configuration data may include for example, what categories or specific data is collected, stored, or transmitted depending on the transformation. For example, the configuration information can take the form of identification of inputs and outputs used with a user defined map function. The configuration may also include a system upload of the user defined map function. In an alternative example, a diagnostic data transformation element may not require a user-defined map. It may only assess inputs, but not require an output with transformed data that would utilize mapping. Although the document or data passing through such an element is not altered, the element is still considered a data transform element in this disclosure. Further examples are discussed below.

In the presently described embodiment, the flow proceeds to block 430. At block 430, the implementation code is received for execution of the data transformation to be conducted by the custom data transform element. The implementation code may be prepared in code within the API. In an example embodiment, JAVA code may be used. However it is contemplated that any type of scripts or any type of code language is possible for the implementation code. The selected code would need to be compatible with the code of the automated development system platform. The custom data transform element parameters would need to indicate which type of code or script is used for the implementation code if a default type is not used. The implementation code becomes part of the customized executable system integration software application generated by the automated development system. This implementation code executes the business process data transformation action indicated in the visual model according to the configuration attributes provided by a user. Examples of implementation code are described further below.

The flow of the presently described embodiment proceeds to block 440. At block 340, the system for creating a custom data transform element receives an icon image to be used on the automated development system platform interface. The image may be an imported image or a created image. The custom data transform element icon may appear in the element menu 212 shown in FIG. 2. The custom data transform element icon identifies the availability of the transform for creating a visual model of the business process to be integrated using the automated development system platform. This custom data transform element icon is associated by the automated development system platform with a codeset and required configuration settings for performing the data transform sought in the model.

The method proceeds to block 450. At block 450, the present embodiment packages the data parameters relating to creation of the custom data transform element in a format to be uploaded to the automated development system platform. The data parameters may include the configuration requirements, the implementation code, icon images, identifying or descriptive information relating to the data transformation, any publication limitations, or other data relevant to creating the custom data transform element. At this phase in the exemplary method, the data parameters for the custom data transform element may also be zip compressed for upload to the automated development system platform.

At block 460, the method uploads the packaged custom data transform parameters to the automated development system platform. In an example embodiment, the automated development system platform resides on a service provider network/system. Accordingly in this embodiment, the custom data transform parameters are uploaded to an information handling system residing in the service provider network or system via a network connection. The upload may be executed via the graphical user interface of the automated development system platform. This graphical user interface may be accessed from a user enterprise network or system or from within a service provider network or system. Within a drop down menu or other button or graphical selection technique, the option "Upload custom connector" or similar option is presented. Upon selecting this action in the graphical user interface, the file for the packaged custom data transform parameters may be transmitted to the automated development system platform. The graphical user interface may also indicate whether or not the upload was successful.

Figure 5:
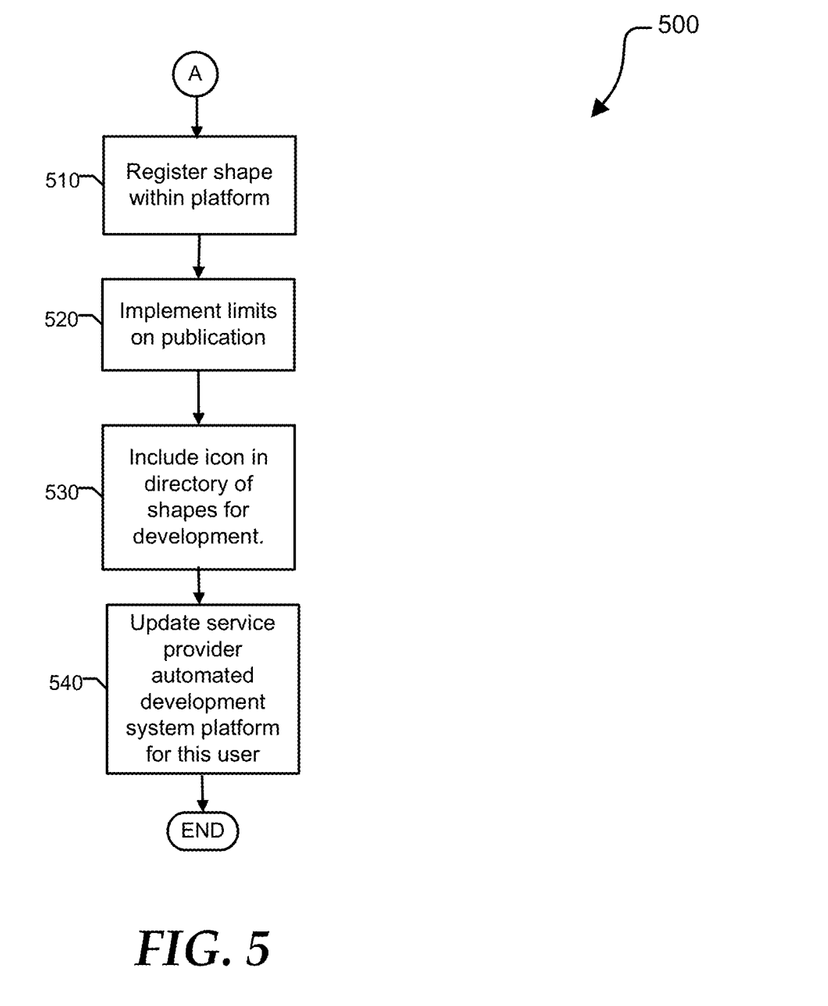

FIG. 5 shows a method 500 for registering a custom data transform element or shape and updating the automated development system platform to integrated and reflect the added custom shape. The flow begins at block 510 where packaged custom data transform element parameters are received at the information handling system hosting the automated development system platform. Upon arrival, the format is detected. The custom data transform element is unpackaged and the code and parameters are uploaded from the received format. The custom data transform element is added to the automated development system platform. The custom data transform element is added to the directory of available shapes. The transform element code, configuration requirements, and other parameters are stored in a database for the automated development system.

Then the flow proceeds to block 520 where the processor operating the automated development system implements the publication limits received with the custom data transform element. If the data field indicates publication with no restrictions, then the automated development system places the custom data transform element into a general directory that is made available be included in the menu of elements usable by all users or subscribers. If, however, the limits data field indicates restrictions to the accounts of the submitting enterprise user, then these limits are applied. Accordingly, the limits may be set to multiple accounts, specific accounts or sub-accounts, individual atoms, individual integrated business process deployments, or various other limitations. In the present embodiment, limits are often applied by account, sub-account, or individual atoms.

The method proceeds to block 530. Depending on the publication limits set, the automated development system includes the custom data transform element and icon in the directory of shapes or elements from which the menu of elements 212 is taken and made available to an integrated business process designer in the graphical user interface. This custom data transform element icon will appear in the menu of shapes 212 to all designers if general publication permitted. Alternatively, the custom data transform element may be limited to enterprise users of the automated development system graphical user interface associated with a specific account or designing for a specified atom. The limits will be set according to the indication received in 520.

In another embodiment, the automated development system platform may present the custom data transform element icon in a sub-menu accessible from the main graphical user interface or in a second menu switchable with the menu of shapes 212. In yet another alternative embodiment, the automated development system may present an option in the graphical user interface to elect to include or not include a custom data transform element in the menu of shapes 212. The automated development system may instead make the custom data transform element available in a library of shapes accessible by a user rather than include the custom data transform element icon in a menu of shapes. The graphical user interface will contain an option permitting access to a library of custom shapes that may be added to the directory of elements available. Accordingly, an icon may be added to the element menu 212.

The flow proceeds to block 540 where the automated development system platform is updated putting into operation a fully functional customized data transform element. As described before, this action may be limited to a specific account in which case the account data is updated to permit access to this customized data transform element for qualified enterprise users.

Detailed examples of customized data transform elements that may be created by the system and method of FIG. 4 are described. These customized data transform functions may not be available in the automated development system provided by the service provider or may utilize a function uniquely used by the enterprise. In a first example, a designer using the automated development system for integrated business process may elect to utilize Extensible Stylesheet Language Transformations (XSLT) code to transform XML documents to a variety of formats. XSLT code may be used to transform XML documents into other XML formats, HTML, flat files, or PDF files, among other file types. The system for creating a customized data transform element would require at least an upload of a custom XSLT script to the API as a configuration parameter. In addition to the XSLT script, the configuration parameter would also require election of the desired XSLT output format. The implementation code is also need to be added as a parameter. The implementation code would instruct a processor to run the XSLT script on input XML documents and output the new formatted documents from the XSLT transform element.

Another example customized data transform element may check for duplicate documents. Configuration parameters would include defining one document data field in the input documents that comprises a unique identifier for each document. The implementation code would include a script instructing a processor to read all documents, find the identifier field in each document, compare the identifier fields of the documents, and skip over or remove duplicate documents from the data flow. The implementation code would output only unique documents.

An additional example customized data transform element may include a document sorting function. Documents may be sorted according to a document data field. Configuration parameters may include selecting a data field to be used to sort the documents and indicating the type of sorting. For example, data fields may be sorted numerically, chronologically, or alphabetically. The implementation code would include instructions to read all documents, find the sorting field in each document, compare the sorting fields of the documents, and order the input documents according to the sorting-type selected. The implementation code would output documents in a sorted order.

Yet another example of a customized data transform element may encrypt or decrypt documents according to a specific encryption algorithm used by an enterprise. In the encryption context, configuration parameters may include selecting and providing the specific encryption algorithm and encryption key used by an enterprise user. The implementation code would include a script instructing a processor to receive input documents, apply the encryption code and key, and output encrypted documents. A similar customized data transform element may decrypt documents by applying the encryption algorithm and key.

Another customized data transform element example may compress or decompress documents according to a specifically-used compression algorithm. In the compression context, configuration parameters may include selecting and providing the specific compression format and compression algorithm libraries to be used. The implementation code would instruct a processor to receive input documents, apply the compression algorithm specified, and output compressed documents. A similar customized data transform element may decompress documents. The above examples are just a few possible custom data transform elements that may be submitted for use with the automated development system of the present disclosure.

Figure 6:
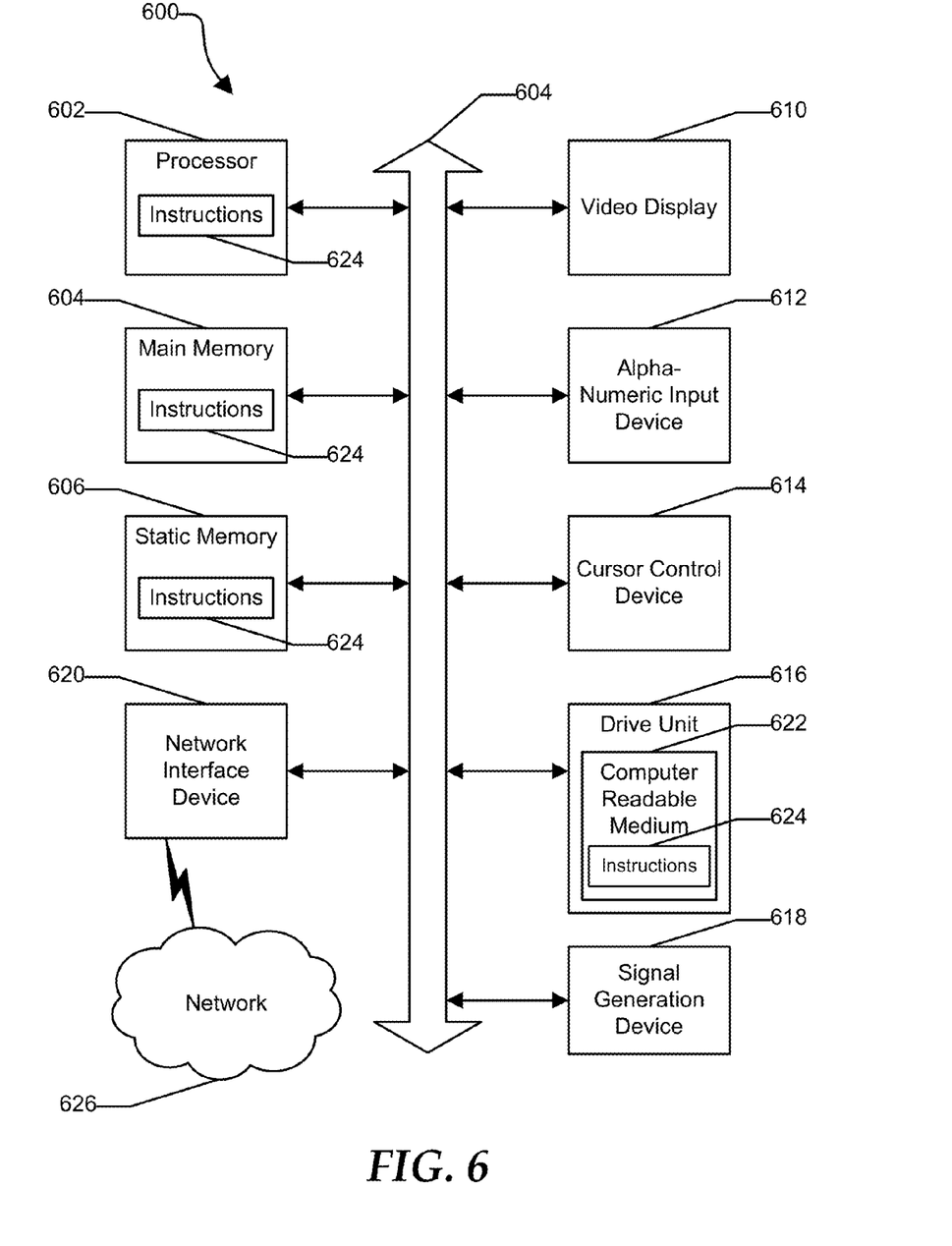
FIG. 6 illustrates a block diagram of an information handling system according to an embodiment of the present disclosure.

FIG. 6 shows an information handling system 600 capable of administering each of the specific embodiments of the present disclosure. The information handling system 500 can represent the user device 20, the systems 30, 60, 70, and 80 of FIG. 1, including the performance prediction system detecting and determining the type of integrated business process being executed, the system executing an integrated business process, or another data processing device associated with the business network system 10. The information handling system 600 may include a processor 602 such as a central processing unit (CPU), a graphics processing unit (GPU), or both. Moreover, the information handling system 600 can include a main memory 604 and a static memory 606 that can communicate with each other via a bus 608. As shown, the information handling system 600 may further include a video display unit 610, such as a liquid crystal display (LCD), an organic light emitting diode (OLED), a flat panel display, a solid state display, or a cathode ray tube (CRT). Additionally, the information handling system 600 may include an input device 612, such as a keyboard, and a cursor control device 614, such as a mouse. The information handling system 600 can also include a disk drive unit 616, a signal generation device 618, such as a speaker or remote control, and a network interface device 620. The information handling system 600 can represent a server device whose resources can be shared by multiple client devices, or it can represent an individual client device, such as a desktop personal computer.

The information handling system 600 can include a set of instructions that can be executed to cause the computer system to perform any one or more of the methods or computer based functions disclosed herein. The computer system 600 may operate as a standalone device or may be connected such as using a network, to other computer systems or peripheral devices.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The disk drive unit 616 may include a computer-readable medium 622 in which one or more sets of instructions 624 such as software can be embedded. The disk drive unit 616 also contains space for data storage. Further, the instructions 624 may embody one or more of the methods or logic as described herein. In a particular embodiment, the instructions 624 may reside completely, or at least partially, within the main memory 604, the static memory 606, and/or within the processor 602 during execution by the information handling system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal; so that a device connected to a network 628 can communicate voice, video or data over the network 628. Further, the instructions 624 may be transmitted or received over the network 628 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computer-implemented method for creating a custom data transform element, the method comprising:
   receiving packaged custom data transform element parameters at an information handling system wherein the information handling system hosts an automated development system platform for creating an integrated business process application;
   registering a custom data transform element for executing a user-defined data transformation in a pre-determined directory of data transform elements of the automated development system platform, wherein the custom data transform element parameters describe the custom data transform element; and
   updating the automated development system platform with the custom data transform element wherein the custom data transform element becomes part of the automated development system;
   wherein the received custom data transform element parameters include configuration requirements for the custom data transform element, custom implementation code for executing the user-defined data transformation, and data identifying the custom data transform element.

2. The method of claim 1, wherein the data identifying the custom data transform element comprises an icon image for use in a graphical user interface of the automated development system platform.

3. The method of claim 1, comprising limiting availability to use the custom data transform element to authorized accounts.

4. The method of claim 3, wherein received custom data transform element parameters further comprise data identifying authorized accounts.

5. The method of claim 1, further comprising receiving data representing a visual model of a business process integration comprising associated user-selected element icons,
   wherein each user-selected element icon is associated with a codeset for a data transformation; and
   wherein at least one user-selected element icon comprises the custom data transform element for the user-defined data transformation.

6. The method of claim 1, further comprising receiving data attributes from a graphical user interface of the automated development system platform that satisfy the configuration requirements for the custom data transform element.

7. The method of claim 1, wherein the received packaged custom data transform element parameters comprise a format in accordance with a specific application programming interface enabling integration of the custom data transform element into the automated development system platform.

8. An information handling system comprising:
   a storage device for storing data representing an automated development system platform for creating an integrated business process application;
   a connection via a network interface for receiving packaged custom data transform element parameters; and
   a processor adapted to execute instructions to register a custom data transform element for executing a user-defined data transformation in a pre-determined directory of data transform elements of the automated development system platform, wherein the custom data transform element parameters describe the custom data transform element wherein the custom data transform element becomes part of the automated development system;
   the processor adapted execute instructions to update the pre-determined directory of data transform elements of the automated development system platform with custom implementation code for executing the user-defined data transformation;
   wherein the received custom data transform element parameters include configuration requirements for the custom data transform element, custom implementation code for executing the user-defined data transformation; and data identifying the custom data transform element.

9. The system of claim 8, wherein the received packaged custom data transform element parameters comprise a format in accordance with a specific application programming interface enabling integration of the custom data transform element into the automated development system platform.

10. The system of claim 8, wherein the data identifying the custom data transform element comprises an icon image for use in a graphical user interface of the automated development system platform.

11. The system of claim 8, further comprising the processor adapted to execute instructions to limit availability of the custom data transform element to authorized accounts.

12. The system of claim 8, further comprising a connection via a network interface for receiving data representing a visual model of a business process integration comprising associated user-selected element icons,
   wherein each user-selected element icon is associated with a codeset for a data transformation; and
   wherein at least one user-selected element icon comprises the custom data transform element for the user-defined data transformation.

13. The system of claim 8, further comprising a connection via a network interface for receiving data attributes from a graphical user interface of the automated development system platform that satisfy the configuration requirements for the custom data transform element.

14. The system of claim 8, further comprising the processor adapted to execute instructions via the automated development system platform to generate a system integration application program including the custom implementation code for executing the user-defined data transformation associated with the custom data transform element.

15. A computer-implemented method for creating a custom data transform element, the method comprising:
   receiving packaged custom data transform element parameters at an information handling system, wherein the information handling system hosts an automated development system platform for creating an integrated business process application;
   registering a custom data transform element for executing a user-defined data transformation in a pre-determined directory of data transform elements of the automated development system platform; and
   updating the pre-determined directory of data transform elements of the automated development system platform with the custom data transform element parameters wherein the custom data transform element becomes part of the automated development system;

wherein the received custom data transform element parameters include configuration requirements for the custom data transform element, custom implementation code for executing the user-defined data transformation, and data identifying the custom data transform element;

wherein the received packaged custom data transform element parameters comprise a format in accordance with a specific application programming interface enabling integration of the custom data transform element into the automated development system platform.

16. The method of claim 15, wherein the data identifying the custom data transform element comprises an icon image for use in a graphical user interface of the automated development system platform.

17. The method of claim 15, comprising limiting availability of the custom data transform element to authorized accounts.

18. The method of claim 15, further comprising receiving data representing a visual model of a business process integration comprising associated user-selected element icons, wherein each user-selected element icon is associated with a codeset for a data transformation; and wherein at least one user-selected element icon comprises the custom data transform element for a user-defined data transformation.

19. The method of claim 15, further comprising receiving data attributes from a graphical user interface of the automated development system platform that satisfy the configuration requirements for the custom data transform element.

20. The method of claim 15, further comprising the automated development system platform generating a system integration application program comprising the custom implementation code for executing the user-defined data transformation associated with the custom data transform element.

* * * * *